United States Patent [19]
Glitho et al.

[11] Patent Number: 5,875,238
[45] Date of Patent: Feb. 23, 1999

[54] TRANSPORT MECHANISM FOR ACCOUNTING MESSAGES WITHIN A TELECOMMUNICATIONS SYSTEM

[75] Inventors: Roch H. Glitho, Montreal, Canada; Stephen R. Hayes, Carrollton, Tex.

[73] Assignee: Ericsson Inc., Research Triangle Park, N.C.

[21] Appl. No.: 576,572

[22] Filed: Dec. 21, 1995

[51] Int. Cl.$^6$ .................................................. H04M 15/00
[52] U.S. Cl. ..................... 375/116; 375/115; 375/127; 375/112; 375/230
[58] Field of Search ................. 379/91.02, 91.01, 379/112, 114, 115, 120, 121, 229, 230, 117, 118, 119, 127, 126, 116

[56] References Cited

U.S. PATENT DOCUMENTS

| | | | |
|---|---|---|---|
| 5,008,929 | 4/1991 | Olsen et al. | 379/112 |
| 5,163,087 | 11/1992 | Kaplan | 379/94 |
| 5,218,632 | 6/1993 | Cool | 379/126 |
| 5,313,463 | 5/1994 | Gore et al. | 370/110.1 |
| 5,392,357 | 2/1995 | Bulfer et al. | 379/115 |
| 5,436,957 | 7/1995 | McConnell | 379/88 |
| 5,440,626 | 8/1995 | Boyle et al. | 379/219 |
| 5,537,464 | 7/1996 | Lewis et al. | 379/114 |
| 5,640,446 | 6/1997 | Everett et al. | 379/115 |

FOREIGN PATENT DOCUMENTS

| | | |
|---|---|---|
| 0544449 | 2/1993 | European Pat. Off. . |
| 9317515 | 2/1993 | WIPO . |
| 9631973 | 10/1996 | WIPO . |

OTHER PUBLICATIONS

Patent Abstract of Japan vol. 15, No. 185 (E–1066), 13 May 1991 and JP 03 045068 A (NEC CORP), 26 Feb. 1991.

Proceedings of the IEEE, vol. 80, No. 4, Apr. 1992, New York, USA, pp. 590–606, XP000304350; A.R. Modarresi et al.: An Overview of Signaling System No. 7.

Michel Mouly and Marie–Bernadette Pautet, *The GSM System for Mobile Communications, Network Management,* 9.1.2. *Billing and Accounting* and 9.1.2.1. *An Example of Toll Ticket,* pp. 572–577.

Primary Examiner—Paul Loomis
Attorney, Agent, or Firm—Jenkens & Gilchrist, P. C.

[57] ABSTRACT

A telecommunications switch serving a roaming mobile station transports the resulting billing records by setting up a communication link with an administrative billing center connected to a Signaling System No. 7 (SS7) telecommunications network by utilizing Transaction Capabilities Application Part (TCAP) signals. Once the connection is established between the telecommunication switch and the administrative billing center, Data Message handler (DMH) formatted data are stored into the SS7 TCAP Invoke signal by the telecommunication switch and transported to the administrative billing center via the SS7 telecommunications network.

16 Claims, 7 Drawing Sheets

TRANSPORT MECHANISM FOR ACCOUNTING MESSAGES WITHIN A TELECOMMUNICATIONS SYSTEM

BACKGROUND OF THE INVENTION

1. Technical Field Of The Invention

This invention relates to charging in a telecommunications network and, more particularly, to the use of SS7 TCAP protocols for communicating accounting messages.

2. Description of Related Art

Developments and improvements in wireless telecommunications switching systems have allowed wireless users to easily move from one physical location to another and still access and utilize the user's own telephone services and subscriber features. One example of this type of service is roaming. Roaming allows the subscriber to move from one city covered by a first telephone company to another city covered by a second telephone company and still use his or her cellular telephone unit. Currently, telephone services toward a roaming subscriber are allowed after the second telephone company requests and receives confirmation data regarding the roaming subscriber's service from the first telephone company. After services have been provided to the roaming subscriber, the second telephone company collects the charging data and sends the information, usually in a batch file, to a centralized administrative center for further analysis. It is at this point that the rightful owner or the centralized billing administrative system determines illegal use of the service by a clone. Since the transfer of the billing batch file is usually done a few days after the actual services have been provided to the roaming subscriber, there is an undesirable time delay before possible fraud is detected.

Cellular radio telephones fall into two main categories, namely mobiles and hand portables. Conventionally, each cellular telephone whether mobile or hand portable has its own unique telephone number by which it may be accessed from other cellular telephones or fixed-wired conventional telephones. The full telephone number is stored in a memory (e.g. a ROM, PROM, or RAM) known in the art as a number assignment module (NAM), that is coupled to the control circuits, usually a microprocessor, of the cellular telephone. When an infringer "steals" a valid cellular telephone number and duplicates the number in another cellular phone (i.e., cloning), the infringer is free to use the telephone service while incurring the charges to the rightful subscriber. Unfortunately, when the roaming subscriber is using the service without proper authority from the rightful owner of the service, the centralized administrative center or the rightful owner of the services is not notified of the illegal usage until the billing records from the second telephone company are received.

A number of security checks have been placed in the system to filter and detect fraudulent calls before they are made. However, it would also be a desirable capability for telecommunications networks to allow services to roaming subscribers while being able to detect fraud on the system on a substantially real time basis after the call is made. The term "real time" for the purposes of the present invention implies a situation where events are handled or notified with minimum time delay after they actually occur in the system. This capability would allow the networks to minimize illegal usage of telecommunication services by narrowing the gap between the time the service is provided to an infringer and the time the centralized administrative center receives the billing records and details the fraud. This capability would also fully support features and services within the telecommunications network that require both billing records and normal telecommunications data at the same time.

SUMMARY OF THE INVENTION

Instead of using a tape drive or a separate network to transport charging records to a centralized administrative center, the present invention advantageously connects the administrative center of the cellular system as a node in the SS7 telecommunication network, and all charging records are transported from each local exchange to the administrative center by SS7 TCAP signals. Because of the hierarchical architectural and strict timing requirements required in SS7 telecommunications networks, the implementation of the present invention allows the telecommunications network to continue providing existing telecommunications services to roaming subscribers while detecting illegal usage with minimum time delay. The present invention further allows the telecommunications network to provide and support subscriber features and telecommunications services that require both billing records and normal telecommunications data at the same time using the same network on a real-time basis.

In one aspect, the present invention provides a method and apparatus of handling accounting messages in the SS7 telecommunications network in which accounting messages are transported to the administrative billing center by SS7 TCAP signals.

In another aspect, the present invention provides a SS7 telecommunication network wherein one of the nodes connected to the SS7 telecommunication network is an administrative billing center and all billing records are transported to the billing center using SS7 TCAP signals.

BRIEF DESCRIPTION OF THE DRAWINGS

For a more detailed understanding of the present invention, for further objects and advantages thereof, reference can now be had to the following description, taken in conjunction with the accompanying drawings in which.

DETAILED DESCRIPTION OF EMBODIMENTS

Figure 1:
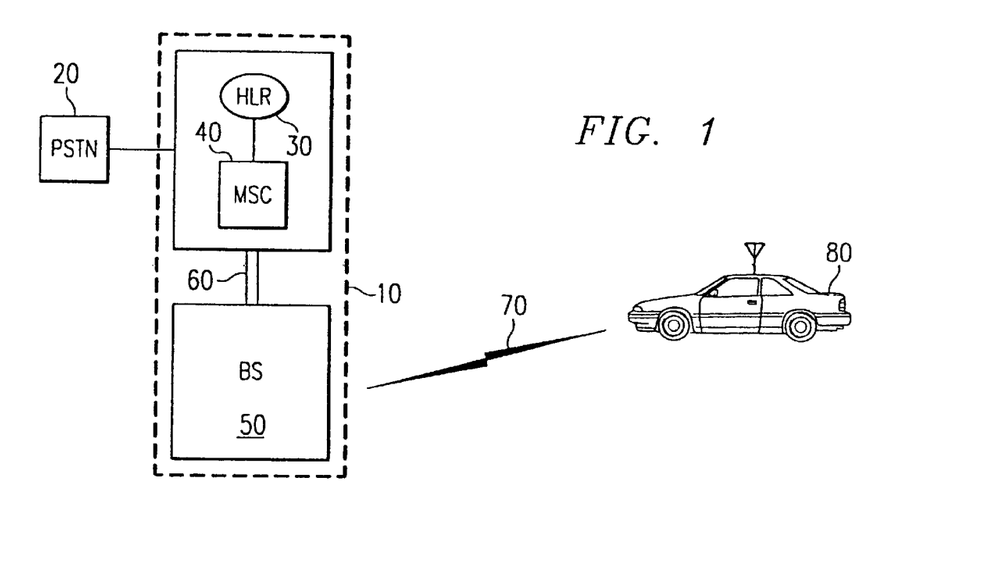
FIG. 1 is a block diagram illustrating a public land mobile network.

FIG. 1 shows a public land mobile network 10 in which the present invention, as will be disclosed herein, may be implemented. The public land mobile network (PLMN) 10, which is used to communicate with a mobile user, comprises a Mobile Services Switching Center (MSC) 40, a Home Location Register (HLR) 30, a base station (BS) 50 and a mobile station (MS) 80. The PLMN 10 is interfaced with a public switched telephone network (PSTN) 20 to provide a communication link to other telephone subscribers. This interface can be made at local, transit or international gateway levels. The BS 50 is connected to the MSC 40 using a digital or analog communications link 60, and communicates with a mobile station via a radio channel 70. The HLR 30 is a data base containing information about all subscribers, their services and location. In large networks with high subscriber densities, HLRs 30 are separate nodes. In small networks, they can be integrated in the MSC 40 as shown in FIG. 1. The BS 50 provides the communication link with a mobile station 80 when the mobile station is within one of the BS's coverage area known as a cell. The MSC 40, which contains the mobile station's 80 subscription, is labeled as the "home MSC." If the subscriber crosses the border to another MSC area during a conversation, an interexchange handoff will take place and the adjacent MSC, known as a "visited MSC," then handles the conversation—this process is known as "roaming." Furthermore, if the mobile station 80 moves to another MSC area and tries to use its telecommunications service, the newly visited MSC notifies the home HLR 30 and requests confirmation data, and accordingly provides the telecommunications service to the visiting mobile station 80—this process is also known as "roaming."

A call from the mobile subscriber starts when the mobile subscriber first keys the desired destination number and then presses the send button. If the mobile subscriber is within its home switch coverage area, an access channel is seized, whereupon the mobile identity and the desired number are automatically transmitted to the MSC 40 via the BS 50. The MSC 40 analyzes the calling subscriber's category to verify that the caller is permitted access to the system. The keyed destination number is also analyzed to determine if the caller is allowed to call that particular number. If all analyses are affirmative, the mobile subscriber is assigned to an analog or digital voice channel 70 and the call is set up.

However, if the mobile subscriber is outside of his own MSC coverage area and is roaming in a new MSC area, the mobile station automatically registers with the new MSC controlling the current area when the cellular unit is turned on. The visited MSC checks whether this mobile station is already registered. If not, the visited MSC informs the home MSC 40 or HLR 30 about the new position of the mobile station. The home MSC 40 or HLR 30 notes in which service area the mobile station is roaming to be able to reroute all incoming calls to the new MSC. The roaming subscriber may now originate and receive calls in the same manner as that used in the home MSC. All special services (call transfer, call waiting, etc.) also automatically follow the roamer. The actual destination number and access validation do not occur until the roaming subscriber dials the destination number. If the mobile station has roamed from a previously visited MSC to a newly visited MSC, or back to the home MSC, the home MSC notifies the previously visited MSC to clear any data regarding that mobile from its visitor's register.

Figure 2:
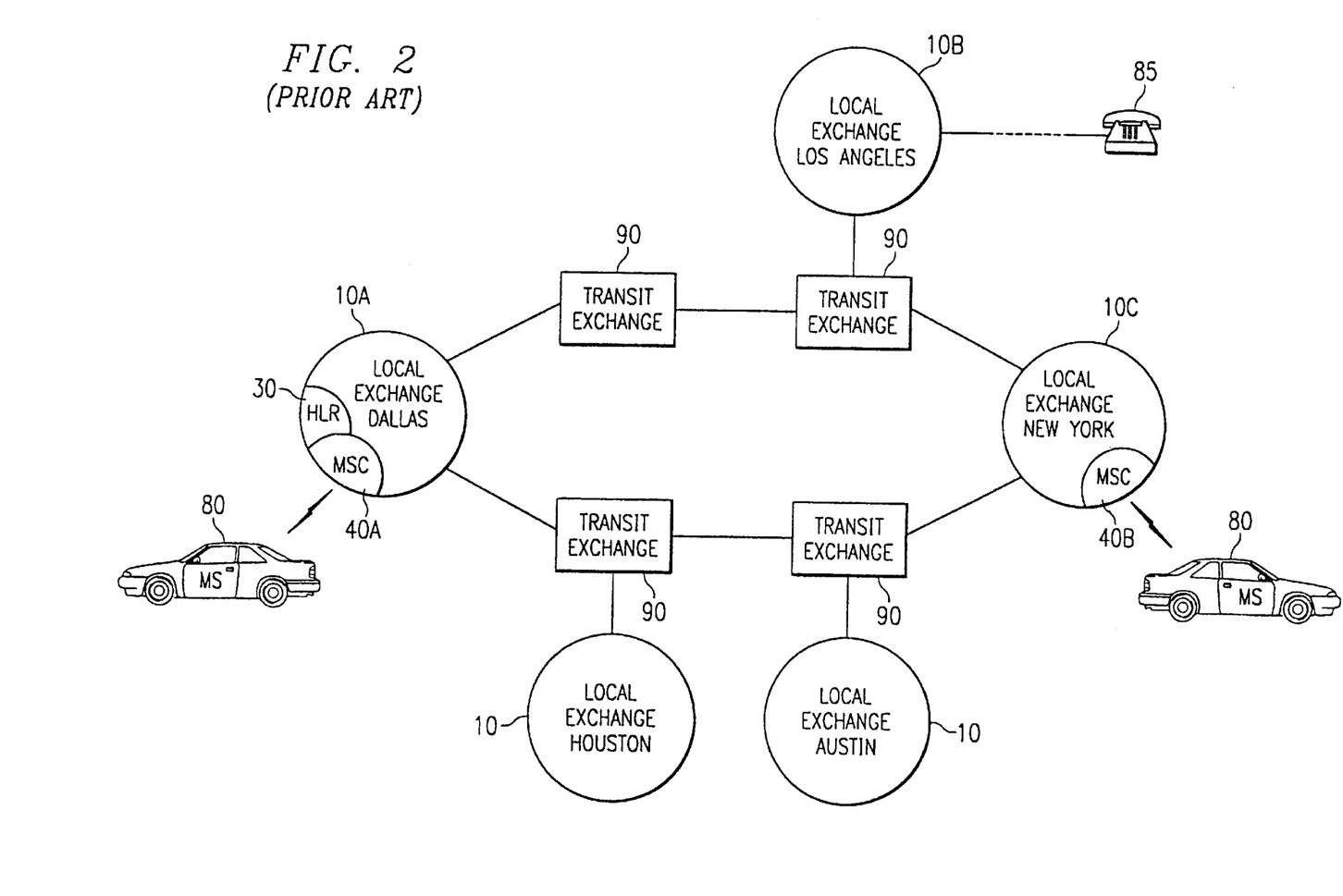
FIG. 2 is a block diagram illustrating a networking of local exchanges and transit exchanges servicing a roaming wireless subscriber.

FIG. 2 is a block diagram illustrating a layout of local exchanges connected to each other in a telecommunications network. A mobile station (MS) 80 connects to the telecommunications network via a Mobile Serving Switching Center (MSC) 40A which is included within a Dallas local exchange 10A. The Dallas local exchange 10A further includes an HLR 30 as also shown in FIG. 1 that keeps track of the status and location of MS 80. When MS 80 dials a destination subscriber 90 connected to a Los Angeles local exchange 10B, a number of transit exchanges such as transit exchanges 90 route the call accordingly to interconnect MS 80 with the subscriber 85.

If MS 80 ever drives to New York and tries to use its phone, a MSC 40B attached to a New York local exchange 10C classifies the MS 80 as a roamer and requests user validity and subscriber data information from the roamer's Dallas local exchange 10A. Once the validation and the necessary data have been received from the home switch, the MS 80 is allowed to use its service.

Figure 3:
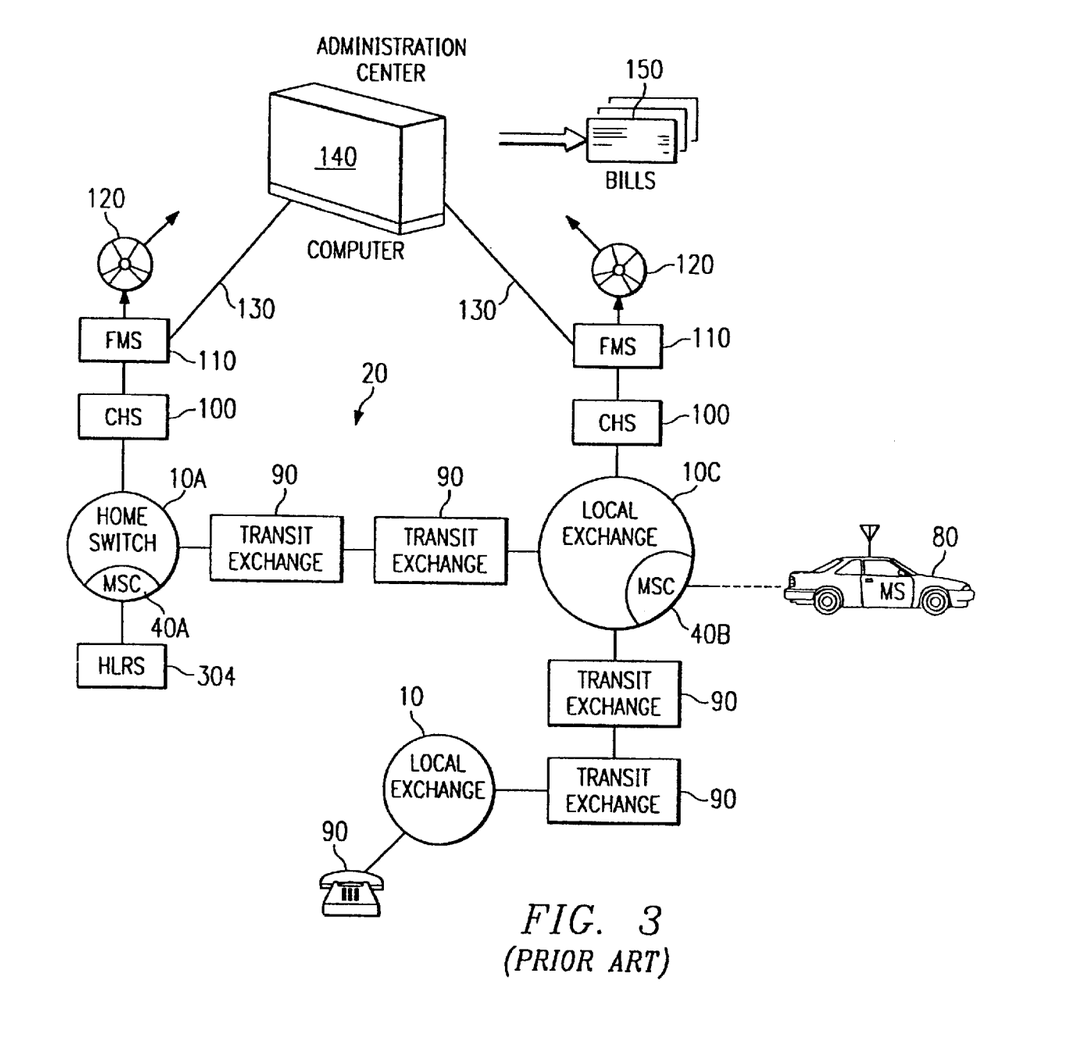
FIG. 3 is a block diagram illustrating how two local exchanges unify their billing records by sending their data stored in magnetic tape to a centralized administrative center.

FIG. 3 is a block diagram of how billing records are generated and consolidated when a mobile station uses more than one local exchange during roaming. When a MS 80, assigned to home MSC 40A, tries to use its telephone service while roaming in an area covered by another local exchange 10C served by a visited MSC 40B, the visited MSC 40B requests validation and subscriber data information from the home switch 10A via PSTN comprising transit exchanges 90. The home switch 10A, in turn, updates the HLR 40A and sends the necessary data back to the visited MSC 40B via the same PSTN comprising transit exchanges 90. Once the MS 80 completes a call to another subscriber such as a subscriber 90 connected to yet another local exchange 10, Call Detail Records (CDRs) are produced by the visited MSC 40B. The CDRs are then sent off to a centralized administrative center 140 for further processing where other CDRs are also received from other local exchanges and consolidated bills 150 are generated for each individual subscriber. These CDRs are usually produced and outputted to magnetic tape 120 by charging subsystems (CHS) 100 and file management subsystems (FMS) 100 within the local exchanges 10A and 10C and physically delivered to the Administrative center 140 via magnetic tapes 120.

This delivery has traditionally been batch oriented; however, recent trends have been to provide message oriented accounting services. Consequently, as an alternative, these CDRs have been transported using a separate network 130 where all the CDR data are packetized and sent over the network 130 to the administrative center 140. Data Message Handler (DMH) is an example of such a standard. It is an interim standard (IS-124) developed by the Telecom Industry Association (TIA) for the exchange of accounting information between network providers.

Maintaining and utilizing this separate network is unreliable, expensive and restrictive. It is unreliable because usually the network has a single node and a single unsupported communication link to connect each local exchange. It is expensive since a separate network has to be maintained to connect all the local switches with the centralized administrative center 140. Furthermore, as the number of connections representing local switches grows, the complexity and the cost of maintaining such networking becomes an insurmountable task. Finally, it could be restrictive if the local switches are only allow to access the network during certain time frame or have to share the network with another system.

As a result, if an infringer is using a clone mobile station to make illegal calls, these activities are not detected right away because of the time delay before those CDRs are received by the administrative center either by tape or packets.

Figure 4:
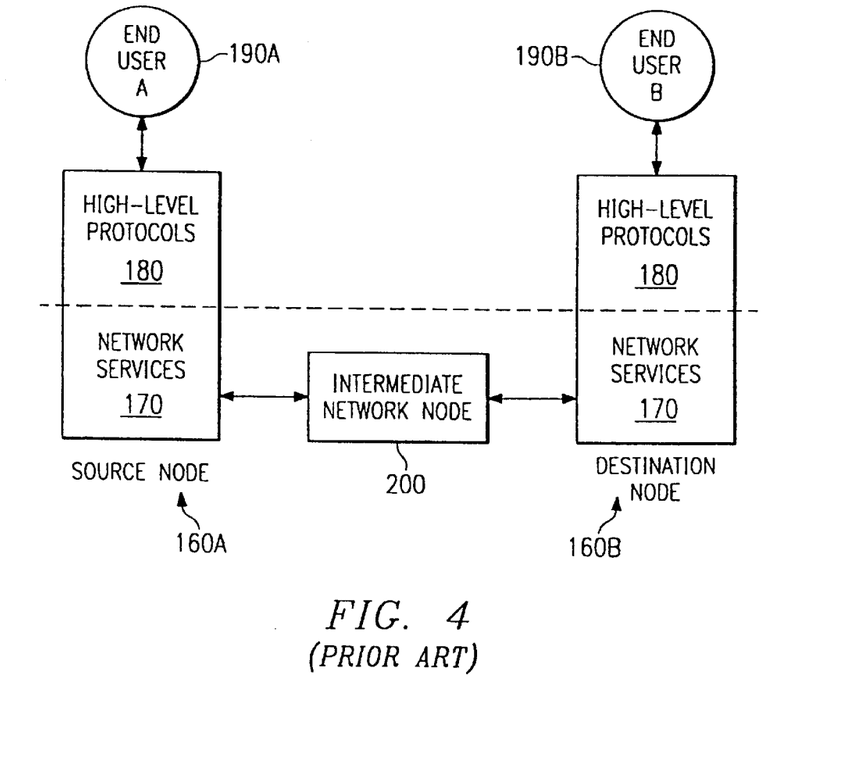
FIG. 4 is an logical diagram representing how two independent machines, like telecommunication switches, reconcile each other's data to properly communicate with each other.

FIG. 4 is a logical diagram representing how two independent computers, perhaps comprising telecommunications switches, synchronize and reconcile their data in order to communicate with each other. In a typical telecommunication network, there are virtually limitless local exchanges and other support computers interconnected with each other to provide telecommunication services to the subscribers. These local exchange switches and computers are manufactured by different vendors and each may have its own protocols and specifications. Each computer, and each application program in the computer, may require a different communication access method and protocol (i.e., a standard convention for communicating intelligently) for a viable "conversation" to proceed. This sets very specific requirements on either or both parties to the conversation. In essence, the data must be presented to the end user in a form that they can recognize and manipulate. This may also involve protocol conversion to accommodate an end user's format, code, and language syntax.

As an illustration, due to developments and improvements in digital processing, telecommunications networks now support video and other interactive customer features as well as normal voice communication. In this videotex service, the supplier usually maintains a database or multiple databases on a variety of subjects of potential interest to customers; travel information, plane/hotel reservation information, shopping information, and so forth. Much of this information is in visual form and is delivered to the customer's terminal in a prescribed graphics format. The two parties to a "conversation" or session, the supplier and the customer, must first agree to set up a session through a network (or series of networks). They must agree on the format of the data ultimately delivered to the screen of the customer's terminal. If the sequence of bits delivered to the terminal in packet makes no sense to that terminal, even if the packet is delivered correctly, nonsense will appear on the screen. The terminal must also be able to regulate the rate of delivery of data; otherwise the source computer that controls the source database could overwhelm the terminal. If connectionless transmission is used, packets may arrive out of order and the recipient terminal must be able to resequence these packets. All of these tasks and others like them have nothing to do with the physical operation of the network. The network may be delivering packets correctly and to the right place, and yet the overall system may not be performing properly. Therefore, it has become common to carry out a sequence of required tasks in an organized fashion, giving rise to the concept of layered communication architectures as shown in FIG. 4.

The above problems have led the International Organization for Standardization (ISO) to launch an intensive effort to develop a worldwide communication architecture standard that would allow different systems to communicate openly and resulted in Reference Model for Open Systems Interconnection (OSI). This architecture and others like them recognize that there are essentially two parts to the complete communications problems; (a) that of timely and correctly delivering data to the right place in the network, and (b) that of delivering recognizable data to both end users engaged in a conversation or session over a network or series of networks.

A number of "network protocols" have been developed to handle the first part of the problem. The second part is solved by introducing "higher-level protocols" 180. Desirably, a complete end-user-oriented architecture encompasses both kinds of protocols. Accordingly, FIG. 4 portrays communication between an end user A 190A and an end user B 190B as an example in terms of this characterization. An intermediate network node 200 in the network is shown as well. This node could also have end users connected to it. However, the purpose of the intermediate node, so far as other network users are concerned, is only to provide the appropriate network services. Therefore, network services 170 in the source node 160A and corresponding network services 170 in the destination node 160B communicate with each other to allow the data to be transmitted and received at the destination correctly and in timely fashion. High level protocols 180 in the source node 160A and corresponding high level protocols 180 in the destination node 160B ensure that the data ultimately delivered to the end user at the destination by the network services are recognizable and in the proper form for their correct use.

Moreover, the two groups—protocols providing network services and higher-level protocols—are typically broken down further into a series of levels or layers chosen to provide a particular service in terms of the basic problems just described: delivering data correctly, on time, and in recognizable form. More precisely, through the development of the OSI reference Model, the concept has developed of having each layer provide a service to the layer above it.

Figure 5:
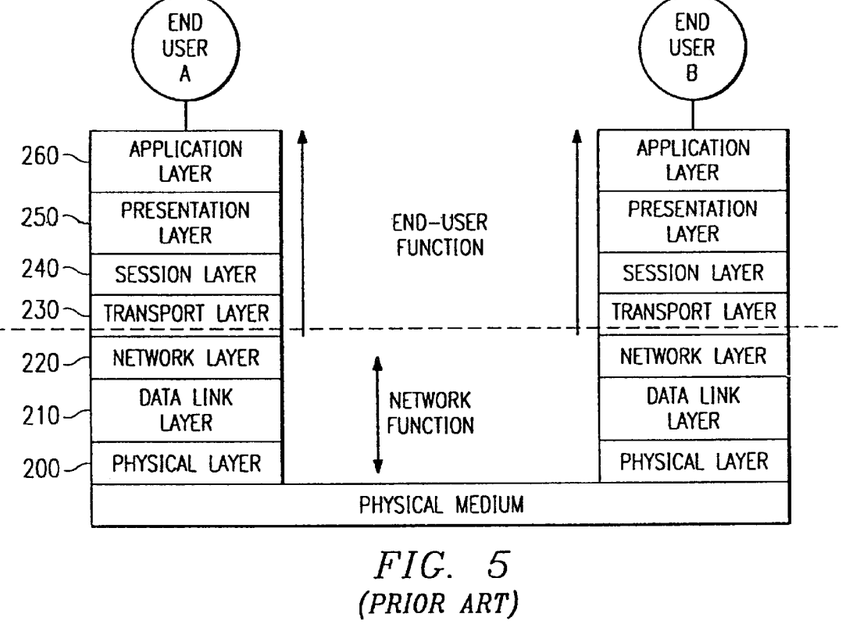
FIG. 5 is an logical diagram representing the seven layers of Open System Interface (OSI)

Accordingly, there are seven different layers in OSI. As shown in FIG. 5, they are the Application Layer 260, Presentation Layer 250, Session Layer 240, Transport Layer 230, Network Layer 220, Data Link Layer 210, and Physical Layer 200.

As the highest layer in the Reference Model of OSI, the Application Layer 260 provides a means for the application processes to access the OSI environment. Hence the Application Layer 260 is the sole means for the application or process to access the OSI environment and to serve as the interface between correspondent application-entities which are using the OSI to exchange meaningful information.

The Presentation Layer 250 provides for the representation of information that application-entities either communicate or refer to in their communication. The Presentation Layer 250 covers two complementary aspects of this representation of information: (a) the representation of data to be transferred between application entities; and (b) the representation of the data structure which application-entities refer to in their communications, along with the representation of the set of actions which may be performed on this data structure. However, the Presentation Layer is concerned only with the syntax (i.e. the representation of the data) and not with its semantics (i.e. their meaning to the Application Layer) which is known only by the application-entities.

The purpose of the Session Layer 240 is to provide the means necessary for cooperating presentation entities to organize and synchronize their dialogue and to manage their data exchange. To do this, the Session Layer 240 provides services to establish a session connection between two presentation entities, and to support orderly data exchange interactions.

The Transport Layer 230 provides transparent transfer of data between session-entities and relieves them from any concern with the detailed way in which reliable and cost effective transfer of data is achieved. Therefore, the Transport Layer 230 optimizes the use of the available network service to provide the performance required by each session entity at minimum cost.

The Network Layer 220 provides the means to establish, maintain and terminate network connections between open systems containing communication application entities and the functional and procedural means to exchange network-service data units between transport entities over network connections. It provides to the transport entities independence from routing and relay considerations associated with the establishment and operation of a given network connection. This includes the case where several subnetworks are used in tandem or in parallel. It makes invisible to transport entities how underlying resources such as data link connections are used to provide network connections.

The Data Link Layer 210 provides functional and procedural means to establish, maintain and release data link connections among network entities and to transfer data link service data units. A data link connection is built upon one or several physical connections. The Data Link Layer 210 also detects and possibly corrects errors which may occur in the Physical Layer 200.

Lastly, the Physical Layer 200, which is the lowest and most hardware dependent layer in OSI, provides mechanical, electrical, functional and procedural means to activate, maintain and de-activate physical connections for bit transmission between data link entities.

However, the fact that a system is "open" does not imply any particular systems implementation, technology or means of interconnection, but refers to the mutual recognition and support of the applicable standards. Therefore, it is not the intent of OSI either to serve as an implementation specification, or to be a basis for appraising the conformance of actual implementations, or to provide a sufficient level of details to define precisely the services and protocols or the interconnection architecture. Rather, ISO provides a conceptual and functional framework which allows users to work productively and independently on the development of standards for each layer of the Reference Model of OSI. Accordingly, each network has to develop its own set of detailed specifications conforming to the OSI model to actually achieve compatible telecommunication network.

In the United States and worldwide, the most widely accepted OSI based standard for telecommunications communication has been Common Channel Signaling (CCS). In the telecommunications field, there are basically two different ways of sending various signaling messages in order to connect User A with User B. In the traditional telephone mode, referred to as inband signaling, signaling messages are sent over the same trunks as the information messages or calls themselves. In recent years, telephone networks have begun to introduce common-channel signaling, in which control messages or signals are carried over separate signaling channels. In the United States, in particular, this had led to the use of a separate packet-switched network called the Common Channel Signaling (CCS) network for transmitting call setup and routing packets, as well as other supervisory and control information. However, CCS does not necessary require a separate network as signals could just as well be sent using dedicated signaling slots of a Time Division Multiplexing (TDM) frame.

With the advent of digital switching, CCS has rapidly become the preferred way of handling the connection of calls in circuit-switched networks. The objectives of CCS are to provide significant improvements in call connect time and considerably increased signaling capacity. These are made possible by modern digital techniques, the widespread use of computer controlled digital systems and by the availability of wide-band transmission facilities.

As mentioned briefly before, a separate signaling network may be used for CCS, or signaling may be done using the same physical facilities of the circuit-switched network, occupying separate channels (commonly time slots of a TDM frame) set aside for this purpose. Since signaling messages themselves are packets or short blocks of data, common-channel signaling has developed using packet-switched technology. A telephone network that adopts CCS as its method of handling the setting up and tearing down of circuit-switched calls thus uses two technologies: circuit switching for the calls themselves; and packet switching for the control messages required to handle the connection and disconnection of calls. The most commonly used technology for implementing CCS has been the Signaling System No. 7 (SS7) created by the CCITT.

The International Telephone & Telephone Consultative Committee (CCITT) is a UN treaty organization made up of the postal, telegraph and telephone authorities of member countries. CCITT works closely with ISO in the development of standards for communications. A CCS system developed by the CCITT and adopted as a recommendation in 1981 is called the CCITT Common Channel Signaling System No. 7, or simply Signaling System No. 7 (SS7). It is rapidly becoming recognized as the international standard. This CCS signaling system, designed using the concepts of packet switching and tailored to conform with the OSI model, has been developed for use with both national and international traffic, for local and long-distance networks, for interexchange signaling, and for various types of channels, including both terrestrial and satellite channels. Furthermore, the introduction of a packet-switched network used to carry call-signaling messages makes other data-handling services possible as well. These services include the simultaneous transmission of various types of traffic, data, voice and video, among others. They make available the possibility of special types of call services such as "800" call features and services, call forwarding, calling party identification and other database administrations.

Figure 6:
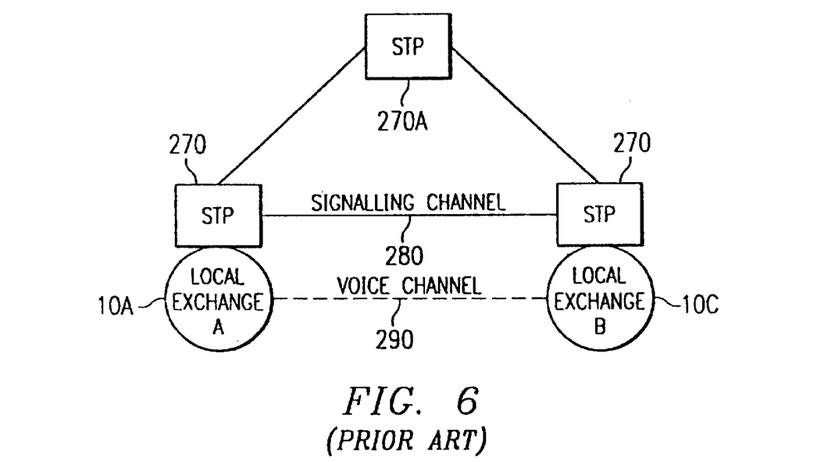
FIG. 6 is a block diagram of a section of a SS7 telecommunications network.

FIG. 6 is a illustrative diagram representing a section of a normal SS7 telecommunications network. To carry out the routing and signaling function, messages must be sent via the packet-switched signaling network from a local exchange A 10A to a local exchange B 10C. Signal Transfer Points (STPs) 270 either located at an exchange or geographically separate, are designated to provide the generation and transfer of signaling messages. One signaling channel 280 is shown associated with two local exchanges 10A and 10C. A voice channel 290 allowing "conversation" between the two exchanges is separately represented as shown. Messages involving the use of trunks (channels) that connect these two exchanges are in this case transmitted directly between them. However, signals relating to the local exchange A 10A and the local exchange B 10C may also be transferred via an intermediate STP 270A, as shown. This mode of operation is called a nonassociated one. Both modes of operation have been defined in SS7 and as a result provide great robustness and reliability since the failure of one link will not affect the overall performance.

Figure 7:
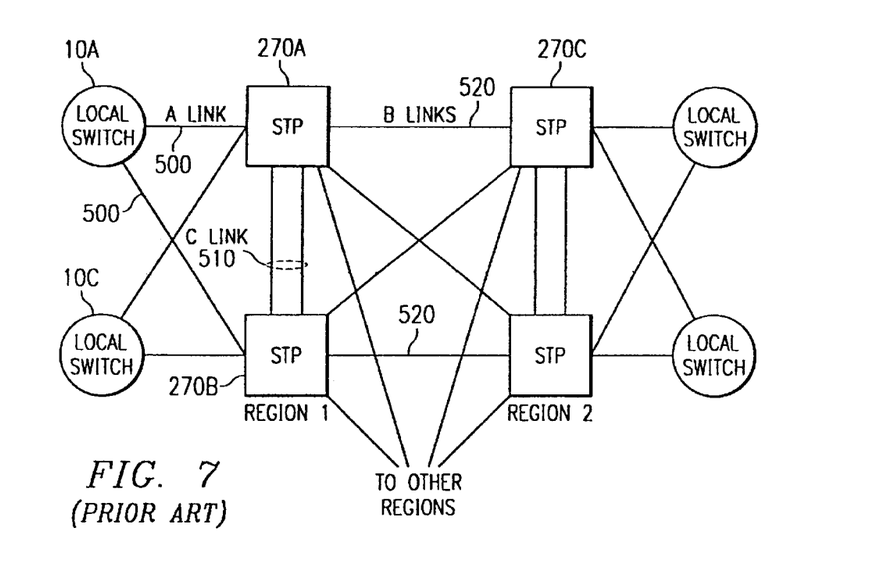
FIG. 7 is a block diagram illustrating how each local exchange is connected to the CCS-SS7 network.

Now referring to FIG. 7, the CCS-SS7 network as shown is fully connected for reliability and robustness. The United States is divided into 10 regions and each of the 10 regions has two interconnected duplicated STPs 270A and 270B. The regional STP 270A is augmented by the area STP 270B for reliability. The A-links 500 provide access to the network from a local switch 10A where the local switch 10A is also connected to both STPs 270A and 270B for reliability. The STPs such as 270A and 270C in the network are themselves interconnected by so called B-links 520, while duplicate STPs in a region are connected by C-links 510. Furthermore, SS7 is designed for 56-kbps and 64-kbps transmission capacities, which speed up the call-connect process, allow faster transmission of signaling messages, and enable capacity to be increased drastically.

The hierarchy of the CCS-SS7 architecture allows the addition of a new node or switch to the network with minor adjustments, and because each region is supported by two STPs and two A-links and B-links, it provides great reliability and robustness. If a STP or a link goes down, the network will automatically reroute the data and maintain its network reliability automatically. Also, because of its addressing mechanism and global title translation, data can be transmitted by a local switch without the local switch knowing exactly where the destination switch is located. Lastly, because of its transmission capacities, the data transfer rate is greatly increased and near real-time capability is achieved.

Figure 8:
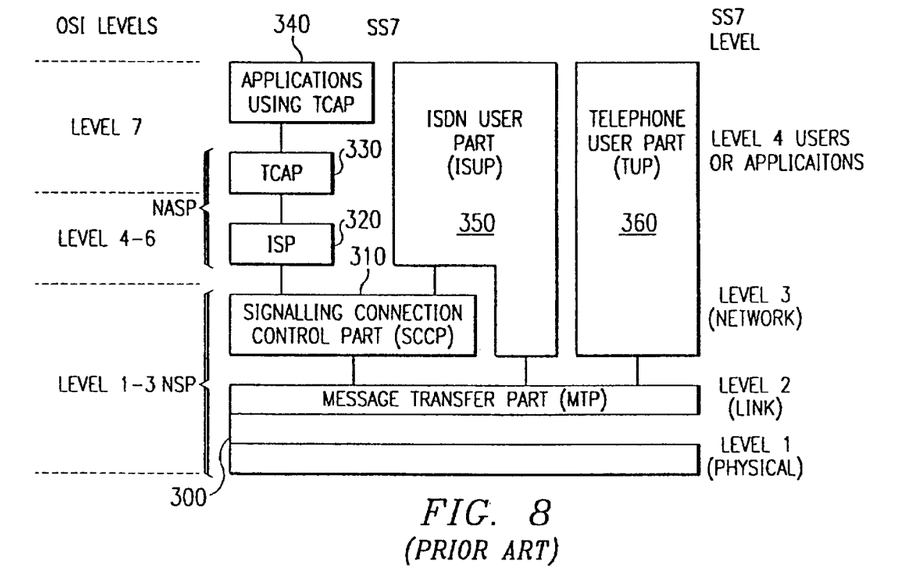
FIG. 8 is a logical diagram comparing the four levels of SS7 with the seven layers of OSI.

Now referring to FIG. 8, even though SS7 protocol is designed to conform with the OSI Reference Model, it does not fit the seven layers of OSI exactly. As shown in FIG. 8, there are less than seven layers in SS7. Basically, SS7 has two parts, a user part and a message transfer part. The user part comes in several varieties, each one corresponding to higher-layer protocols that enable user functions, possibly on dissimilar machines, to communicate with one another. Examples of such user parts include a Telephone User Part (TUP) 360 for basic telephone service, and an Integrated Service Digital Network (ISDN) User Part (ISUP) 350 for providing combined voice, data and video services. These user parts make use of the network delivery services provided by the Message Transfer Part (MTP) 300 which provides a connectionless (datagram-type) but sequenced transport service. The function block labeled Signal Connection Control Point (SCCP) 310 provides the conversion from the MTP 300 to the network service specified by the OSI model.

It is apparent from FIG. 8 that different user parts enter the OSI model at different points in the hierarchy. The ISUP 350, for example, deals solely with services within the network and hence appears in the network layer of the OSI. User parts residing within the network layer of the OSI, but requiring presentation, session, and transport features similar to those provided by the overall OSI model as shown in FIG. 5, obtain these from the Network-Application Service Part (N.ASP) levels which consist of the Transaction Capability Application Part (TCAP) 330 and the Intermediate Services Part (ISP) 320.

This SS7 network structure and the SS7 protocols are an enhancement and advantageous over the separate network used by local exchanges to transmit billing records to the administrative center as defined in the prior art. Consequently, the preferred embodiment of the present invention utilizes this SS7 network to transport CDR data to the administrative center to take full advantage of the benefits offered by the SS7 network.

The reason the above CCS-SS7 network and SS7 signals have not been used before for transporting billing records was because, historically, billing has always been considered the domain of data communications while SS7 is considered signaling. Because of this artificial distinction, SS7 was not considered as a transport protocol even though it filled many of the requirements for transporting invaluable data such as billing. As a matter of fact, the DMH standard calls for the use of a Non-Signaling Data Protocol where an application level protocol such as Remote Operations Service Element (ROSE) sitting on top of transport mechanism such as X.25 defined by the CCITT is usually used for transporting the packetized data in a network, and Association Control Service Element (ACSE) signals are used to set up the conversation between the switch and the administrative center. Therefore, instead of discarding all existing standards and protocols used in transporting billing records, the present invention discloses a system where parts of the prior art's standards and protocols are used on top of the SS7 protocols to minimize the modification and changes to the existing SS7 network and to utilize and salvage the existing DMH standard.

Figures 9, 12:
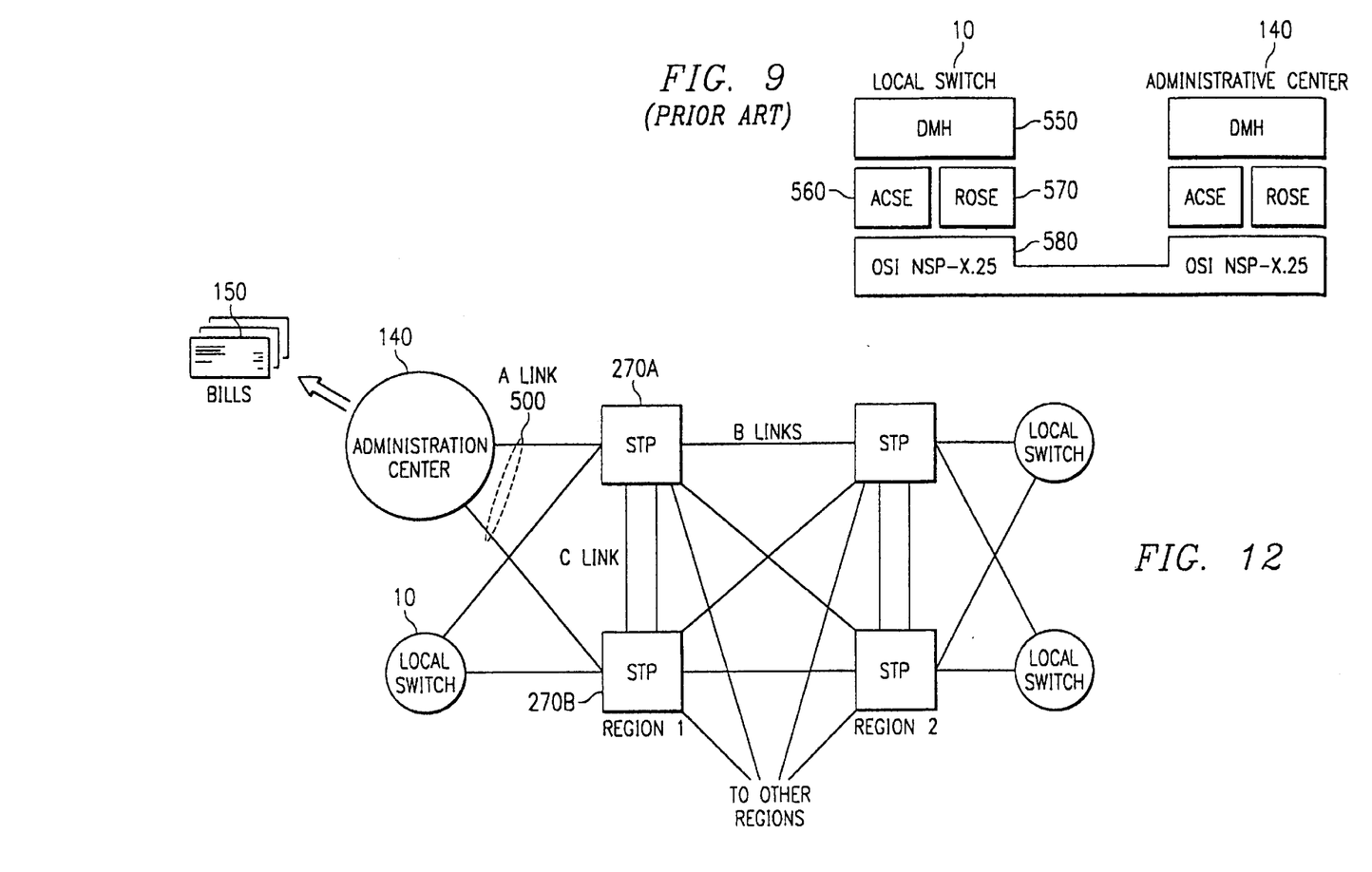
FIG. 9 is a logical diagram representing how the data message handler (DMH) standard is interfaced with Remote Operations Service Element (ROSE) and Association Control Service Element (ACSE) signals for transporting Call Detail Records (CDR) records to a centralized administrative center as defined in the prior art.
FIG. 12 is a block diagram illustrating how SS7 telecommunications networks include the administrative center as one of its nodes in order to communicate with other local switches in accordance with the teachings of the present invention.

FIG. 9 represents a logical diagram representing the interfaces between the different protocols the separate network uses to transport CDR data from a local switch to a centralized administrative center as defined in the prior art and partly salvaged according to the preferred embodiment of the present invention. In order to reconcile all CDRs received from a number of different local exchanges, a set of protocols and messages were created for distributed billing collection known as Data Message Handler (DMH). Under DMH, all the records that are produced have globally unique identifiers and sequence numbers that allow them to be correlated. The DMH standard was actually developed by the cellular industry to solve the settlement issues associated with roaming subscribers. The DMH standard defines a set of messages and procedures for exchanging those settlement messages. In the DMH standard, these data are defined using Abstract Syntax Notation One (ASN.1) and transported using a separate application level protocol over an Open System Interface Network Service Part (OSI NSP) such as X.25 defined by the CCITT. ASN.1 itself was developed as a standard to provide a machine independent way of specifying data structure that needs to be transported from one machine to the other. Hence, the ASN.1 standard defines items such as how many bytes are required to encode integers, real-numbers and strings.

As has been noted, DMH further requires specifications for its data content and carrier or transport mechanism for transporting the messages from one node to another node in a network. Therefore, the DMH standard 550 is supported by two separate protocols; Association Control Service Element (ACSE) 560 and Remote Operations Service Element (ROSE) 570. ACSE signals are used to initiate connection setup and termination between two nodes, and ROSE signals are used to store the contents of the data for delivery to each other. Once the connection is established by ACSE signals, ROSE signals such as ROIV (ROSE Invoke), RORS (ROSE Result), ROER (ROSE Error), and RORJ (ROSE Reject) are used to store and to communicate the actual data according to the ASN.1 standard for delivery to the administrative center. The actual transporting is carried out by the OSI Network Service protocol such as X.25 over the physical network.

The present invention discloses a system where by replacing the ACSE, ROSE and X.25 protocols with corresponding parts in the SS7 protocol, the local switch can utilize the already existing CCS-SS7 network to transport the CDR data to the administrative center without incurring any additional costs. Such networking takes the full benefit of the SS7 network by having the data delivered on a real time basis while being reliable, robust, organized and cost effective.

Figure 10:
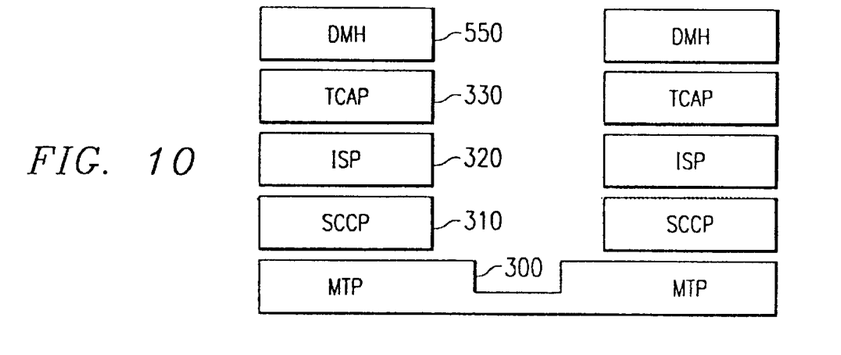
FIG. 10 is a block diagram illustrating the use of SS7 protocols to communicate charging information in accordance with the teachings of the present invention.

Accordingly, FIG. 10 represents a logical diagram showing how DMH messages 550 are interfaced with a TCAP 330 and to be transported by a MTP 300 in a CCS-SS7 telecommunications network according to the preferred embodiment of the present invention. DMH no longer uses ACSE signals using a separate network to transport the billing records to the centralized administrative center. The administrative center becomes one of the nodes supported by the STPs and fully connected to the CCS-SS7 telecommunications networks. DMH messages are interfaced with the TCAP 330 within each local exchange to setup and establish a connection and the CCS-SS7 MTP 300 is used as the physical medium for transporting the billing records from the local switch to the administrative center.

As mentioned before, the Transaction Capability Application Part (TCAP) 330 is a SS7 User Part (UP) supporting and interfacing with an application layer subsystem. Even though TCAP is a SS7 protocol, it has also been defined as a ROSE based protocol and has been recently enhanced to provide and support services provided by ACSE. Since TCAP already supports or is able to interface with the subsystem handling the DMH standard, the subsystem needs not be modified in order to interface with TCAP instead of ACSE. Consequently, using TCAP to exchange the accounting messages will facilitate the mapping on both X.25 and SS7 NSP. The use of TCAP instead of ACSE or ROSE is an enhancement and advantageous over the prior art because TCAP is already widely deployed and used in the telecommunications environments while ROSE and ACSE are not. The existing TCAP infrastructure can be used with no modification since it already supports all ACSE functions. Since TCAP is SS7 protocols, DMH messages sitting on top of TCAP can be directly mapped onto SS7 NSP without additional software cost. TCAP is an SSP UP and all SSP UP has been specified to run directly on top of SS7 NSP (the SCCP 310 and the MTP 300 via the interface ISP 320).

Accordingly, the following TCAP messages are preferred in the present invention to handle setup, disconnect, and transfer of billing record messages in the SS7 network:

TABLE 1

ACSE/ROSE to SCCP Message Mapping.

| ACSE/ROSE SERVICE | SCCP MESSAGES |
|---|---|
| ACSE services (Session setup / tear down services) | TCAP Dialogue Request, TCAP Dialogue Response TCAP Dialogue Abort |
| ROIV (Invoke) | TCAP Invoke |
| RORS (Result) | TCAP Result |
| ROER (Error) | TCAP Error |
| RORJ (Reject) | TCAP Reject |
| All DMH operations (aggregateDelivery, aggregateRequest, certifiedDelivery, rateRequest, recordRequest, retransmissionRequest, uncertifiedDelivery) | Transparent to TCAP Messages |

Accordingly as shown in Table 1, connection setup between the local switch and the administrative center is handled by the TCAP Dialogue Request, TCAP Dialogue Response, and TCAP Dialogue Abort instead of ACSE signals. Delivering of the DMH formatted data is handled by the TCAP Invoke, TCAP Error, and TCAP Result signals instead of ROSE signals. Because of the fact that TCAP fully supports the DMH standard, DMH signals such as RateRequest, and RetransmissionRequest are passed transparent to TCAP and SCCP, and there is no need to map them over to a new set of signals.

Figure 11:
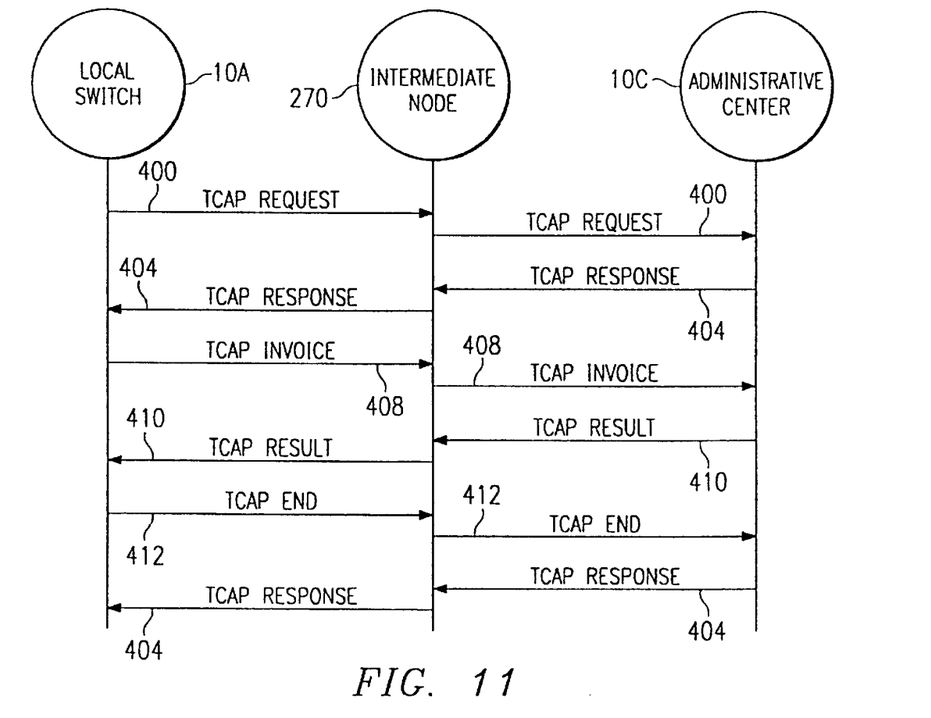
FIG. 11 is a SS7 signal chart representing a sequence of signals generated to connect and disconnect a communication link between a local switch and an administrative center over a common channel signaling (CCS) network.

FIG. 11 is an SS7 signal chart representing a sequence of signals to connect, deliver, and disconnect a communication link between the local switch 10A and the administrative center 10C through an intermediate node 270 according to the preferred embodiment of the present invention. As mentioned previously, according to the present invention, DMH no longer uses ACSE or ROSE signals to transport the data. The administrative center 10C is one of the nodes supported by the STPs and fully connected to the SS7 telecommunications network. When the local exchange 10A wishes to connect to the administrative center 10C to transport billing records, TCAP Dialogue Request 400 signal is transmitted toward an appropriate STP 270 or STPs 90. The STP 90, according to the SCCP global title translation table, relays the TCAP Dialogue Request signal 400 to the correct destination. The administrative center 10C returns the connection request from the local switch 10A by returning a TCAP Response signal 404 to the local switch 10A. Once the connection has been set up by both nodes, the local switch 10A encapsulates the billing data in a TCAP Invoke signal 408 and transmits it over the SS7 network to the administrative center 10C. The administrative center 10C returns the results of the data reception by storing a result code in a TCAP Result signal 410 and transmits it back to the local switch 10A. After the completion of the transmission of the billing data, the local switch 10A releases the call connection by sending a TCAP End signal 412 toward the administrative center 10C. Once the release request is received by the administrative center 10C, the center acknowledges and releases the physical connection and transmits the final signal, TCAP Response signal 404 with the appropriate result code, back to the local switch 10A.

Although only one possibility for call release has been indicated, the protocol is symmetrical; either the calling party or the called party may initiate release via a TCAP End 412. Release may also be initiated by any one of the nodes (switches) if it becomes congested by transmitting TCAP Abort or TCAP Error.

Now referring to FIG. 12, a layout of the SS7 telecommunications network having an Administrative Center 140 as one of its node served by STPs 270A and 270B is shown as the preferred embodiment of the present invention. As previously described during the description of FIG. 7, each node in the SS7 network, including the Administrative Center 140, is supported by dual STPs 270A and 270B and dual A-link communication line 500. Such networking guarantees the ambitious throughput and latency requirements required of capabilities such as advice of charging or fraud detection. Such networking also reduces the maintenance tasks required to support the routing information needed as the number of DMH nodes grow in the networks. The hierarchical routing available in SCCP provides a mechanism for resolving names, and the global title translation can be used to simplify routing. Furthermore, the above networking provides the level of robustness required for transferring accounting information because the SS7 NSP provides many mechanisms for rerouting and network recovery to ensure the robustness of the network. Finally, the above SS7 networking also fully supports features that require both billing information and signaling information at the same time in a real-time basis (such as sophisticated advice of charge capabilities). This was not possible before because the signaling networks and accounting networks were two distinct networks in prior art. Including both accounting information and signaling information in the same SS7 network allows nodes to provide services that require both types of information at the same time (e.g. terminating a call if fraud is detected).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for communicating accounting messages within a telecommunications network, said system comprising:
    a switch node connected to said telecommunications network, said node providing telecommunications services to a telecommunications subscriber for which formatted accounting data are generated, said switch node comprising:
        a first subsystem for formatting said formatted accounting data in accordance with a Data Message Handler (DMH) standard;
        a second subsystem fog processing TCAP signals, said TCAP signals comprising:
            a first set of signals for establishing communication between said switch node and said administrative center node over said communications link; and
            a second set of signals for carrying said first subsystem formatted accounting data; and
        a third subsystem for transmitting said TCAP signals over said communications link to said administrative center node using a Message Transfer Part (MTP) level of Signaling System No. 7;
    an administrative center node for collecting and analyzing formatted accounting data; and
    a Signaling System No. 7 (SS7) communication link connecting said switch node to said administrative center node and over which said formatted accounting data generated by said node are transmitted to said administrative center node using Common Channel Signaling System No. 7 (337) Transactional Capabilities Application Part (TCAP) signals.

2. The System of claim 1 wherein said second set of signals includes:
    SS7 TCAP Invoke;
    SS7 TCAP Result;
    SS7 TCAP Error; and
    SS7 TCAP Reject.

3. A Common Channel Signaling System No. 7 (SS7) network system for transporting accounting messages, said network system comprising:
    a plurality of nodes, wherein certain ones of said nodes generate Data Message Handler (DMH) formatted accounting messages;
    a plurality of communications links interconnecting said plurality of nodes;
    a Transaction Capabilities Application Part (TCAP) module within each of said nodes for handling said DMH formatted accounting messages;
    a Message Transfer Part (MTP) module within each of said nodes for transmitting or receiving said DMH formatted accounting messages over said communications links; and
    a Signaling Connection Control Part (SCCP) module within each of said nodes for interfacing said DMH formatted accounting messages from said TCAP module to said MTP module.

4. The System of claim 3, wherein said certain ones of said plurality of nodes comprise a telecommunications switch, wherein said TCAP module generates TCAP signals, said TCAP signals comprising:
    a first set of signals for establishing communication between said certain ones of said plurality of nodes and others of said plurality of nodes; and
    a second set of signals for carrying said DMH formatted accounting messages.

5. The System of claim 3, wherein one of said plurality of nodes is an administrative center for collecting and analyzing billing records, where said TCAP module receives TCAP signals, said TCAP signals comprising:
    a first set of signals for establishing communication between said certain ones of said plurality of nodes and others of said plurality of nodes; and
    a second set of signals for receiving said DMH formatted accounting messages.

6. The System of claim 4, wherein said set of signals for carrying said DMH formatted accounting messages comprise:
    SS7 TCAP Invoke;
    SS7 TCAP Reject;
    SS7 TCAP Error; and
    SS7 TCAP Reject.

7. A method of transporting accounting data from a first node to a second node wherein said first node and second node are connected within a Common Channel Signaling System No. 7 (SS7) telecommunications network, said method comprises the steps of:
    formatting said accounting data according to a common standard recognizable by said first node and said second node;
    initiating setup from said first node to said second node within said SS7 telecommunications network using SS7 Transaction Capabilities Application Part (TCAP) signals;
    transporting said formatted accounting data from said first node to said second node within said SS7 telecommunications network using SS7 TCAP signals; and
    disconnecting the connection-from said first node to said second node within said SS7 telecommunications network using SS7 TCAP signals.

8. The method of transporting accounting data as claimed in claim 7 wherein said common standard comprises a Data Message Handler (DMH) standard.

9. The method of transporting accounting data as claimed in claim 8, wherein said step of transporting said DMH formatted data includes the step of interfacing with a Message Transfer Part (MTP) module of each node.

10. The method of transporting accounting data as claimed in claim 8, wherein said step of transporting said DMH formatted data includes the steps of using:
    SS7 TCAP Invoke signal;

SS7 TCAP Result signal;
SS7 TCAP Error signal; and
SS7 TCAP Reject.

11. The method of transporting accounting data as claimed in claim 7 wherein said first node comprises a telecommunications switch.

12. The method of transporting accounting data as claimed in claim 7 wherein said second node comprises an administrative billing center.

13. The method of transporting accounting data as claimed in claim 7, wherein said step of initiating setup further includes the step of interfacing with a Message Transfer Part (MTP) module of each node.

14. A system for transporting accounting data from a first node to a second node within a Common Channel Signaling System No. 7 (SS7) telecommunications network, wherein said system comprising:

means for collecting and formatting said accounting data according to a Data Message Handler (DMH) standard within said first node;

means for initiating connection setup from said first node toward said second node using SS7 Transaction Capabilities Application Part (TCAP) signals;

means for storing the contents of said DMH formatted data using SS7 TCAP signals; and means for transporting said DMH formatted data stored in said SS7 TCAP signals from said first node to said second node.

15. A system for communicating accounting messages within a telecommunications network, said system comprising:

a switch node connected to said telecommunications network, said node providing telecommunications services to a telecommunications subscriber for which formatted accounting data are generated;

an administrative center node for collecting and analyzing formatted accounting data, said administrative center node comprising:

a first subsystem for receiving said TCAP signals over said communications link from said switch node using a Message Transfer Part (MTP) level of Signaling System No. 7;

a second subsystem for processing TCAP signals, said TCAP signals comprising:

a first set of signals for establishing communication between said switch node and said administrative center node over said communications link; and a second set of signals for receiving said formatted accounting data; and a third subsystem for extracting said formatted accounting data from said second set of signals in accordance with a Data Message Handler (DMH) standard; and a Signaling System No. 7 (SS7) communication link connecting said switch node to said administrative center node and over which said formatted accounting data generated by said node are transmitted to said administrative center node using Common Channel Signaling System No 7 (SS7) Transactional Capabilities Application Part (TCAP) signals.

16. The system of claim 15 wherein said second set of signals includes:

SS7 TCAP Invoke;
SS7 TCAP Result;
SS7 TCAP Error; and
SS7 TCAP Reject.

* * * * *